US012670709B2

(12) United States Patent
Yoo et al.

(10) Patent No.: US 12,670,709 B2
(45) Date of Patent: Jun. 30, 2026

(54) ALGORITHM AND METHOD FOR DYNAMICALLY CHANGING QUANTIZATION PRECISION OF DEEP-LEARNING NETWORK

(71) Applicant: SEOUL NATIONAL UNIVERSITY R&DB FOUNDATION, Seoul (KR)

(72) Inventors: Ook Sang Yoo, Gimpo-si (KR); Ji Yea Chon, Seoul (KR); Hyuk Jae Lee, Seongnam-si (KR); Kyeong Jong Lim, Seongnam-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 324 days.

(21) Appl. No.: 18/270,649

(22) PCT Filed: Dec. 30, 2021

(86) PCT No.: PCT/KR2021/020293
§ 371 (c)(1),
(2) Date: Jun. 30, 2023

(87) PCT Pub. No.: WO2022/146080
PCT Pub. Date: Jul. 7, 2022

(65) Prior Publication Data
US 2024/0071070 A1 Feb. 29, 2024

(30) Foreign Application Priority Data
Dec. 31, 2020 (KR) ........................ 10-2020-0190012

(51) Int. Cl.
*G06V 10/70* (2022.01)
*G06V 10/28* (2022.01)
(Continued)

(52) U.S. Cl.
CPC .............. *G06V 10/87* (2022.01); *G06V 10/28* (2022.01); *G06V 10/764* (2022.01); *G06V 10/82* (2022.01); *G06V 20/70* (2022.01)

(58) Field of Classification Search
CPC ...... G06V 10/87; G06V 10/28; G06V 10/764; G06V 10/82; G06V 20/70; G06N 3/04; G06N 3/08; G06N 3/0495; G06N 3/047
See application file for complete search history.

(56) References Cited

U.S. PATENT DOCUMENTS

2016/0328646 A1* 11/2016 Lin ........................ G06N 3/045
2018/0285736 A1 10/2018 Baum et al.
(Continued)

FOREIGN PATENT DOCUMENTS

| CN | 110689112 A | 1/2020 |
| KR | 10-2019-0076916 A | 7/2019 |

(Continued)

OTHER PUBLICATIONS

Qing Jin et al. "AdaBits: Neural Network Quantization with Adaptive Bit-Widths", 2020 IEEE/CVF Conference on Computer Vision and Pattern Recognition (CVPR), Aug. 5, 2020, pp. 2146-2156.
(Continued)

*Primary Examiner* — Jianxun Yang
(74) *Attorney, Agent, or Firm* — Bridgeway IP Law Group, PLLC; Hyun Woo Shin

(57) ABSTRACT

Provided is an image recognition method including the steps of: for a deep learning network that carries out object recognition on a random image, carrying out quantization corresponding to the number of a plurality of different bits to generate a plurality of quantization models respectively corresponding to the number of bits; receiving image data as an input for the deep learning network; determining the uncertainty of the input image data; selecting any one of the
(Continued)

plurality of quantization models on the basis of the determined uncertainty; and recognizing an object from the image data by using the selected quantization model, and outputting, as the result of the object recognition, a label corresponding to the image data.

14 Claims, 3 Drawing Sheets

(51) Int. Cl.
   *G06V 10/764*     (2022.01)
   *G06V 10/82*      (2022.01)
   *G06V 20/70*      (2022.01)

(56)                References Cited

U.S. PATENT DOCUMENTS

2019/0188557  A1      6/2019  Lowell et al.
2020/0394523  A1     12/2020  Liu et al.

FOREIGN PATENT DOCUMENTS

KR           10-2029852  B1     10/2019
KR      10-2020-0075071  A       6/2020
WO      WO-2020165629  A1 *    8/2020   ............. G06N 3/063

OTHER PUBLICATIONS

Prateeth Nayak et al., "Bit Efficient Quantization for Deep Neural Networks" EMC2-NeurIPS Workshop, 2019, pp. 1-5.

* cited by examiner

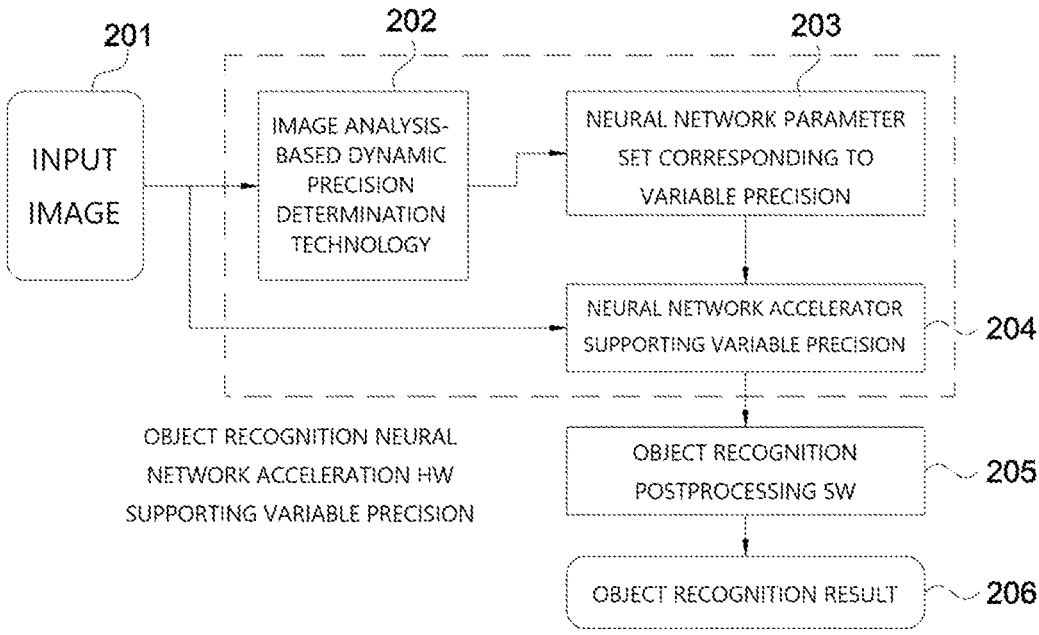

200

201

202

203

INPUT IMAGE

IMAGE ANALYSIS-BASED DYNAMIC PRECISION DETERMINATION TECHNOLOGY

NEURAL NETWORK PARAMETER SET CORRESPONDING TO VARIABLE PRECISION

NEURAL NETWORK ACCELERATOR SUPPORTING VARIABLE PRECISION

204

OBJECT RECOGNITION NEURAL NETWORK ACCELERATION HW SUPPORTING VARIABLE PRECISION

OBJECT RECOGNITION POSTPROCESSING SW

205

OBJECT RECOGNITION RESULT

ALGORITHM AND METHOD FOR DYNAMICALLY CHANGING QUANTIZATION PRECISION OF DEEP-LEARNING NETWORK

TECHNICAL FIELD

The present invention relates to an algorithm for dynamically changing quantization precision for a deep learning network.

BACKGROUND ART

Deep learning is a technology widely used in the fields of artificial intelligence (AI) and computer vision. Various deep learning architectures including convolutional neural networks (CNNs), deep-belief network (DBNs), and autoencoders appear to generate up-to-date results of tasks such as visual object recognition, automatic dialogue recognition, natural language processing, and music/acoustic signal processing. Major efforts of deep learning are focused on software implementation of various network architectures, learning algorithms, and applications.

Lately, active research has been conducted on a hardware accelerator for efficiently using a deep neural network (DNN) with low power. A device for processing a neural network performs a large amount of computation on complex input data.

In particular, a device implemented with low power and low performance requires a technology for efficiently processing computation of a neural network to analyze a large amount of input data and extract desired information in real time through a neural network.

Specifically, a quantization method is used to reduce the amount of deep learning computation. However, according to conventional deep learning network quantization, when learning is completed, bit precision for quantization is fixed for every layer. Accordingly, quantization precision does not change during the runtime of a deep learning network, and thus computation is not efficiently performed.

In other words, a generally used deep learning network quantization technology has a drawback that, once a corresponding deep learning network finishes learning and quantization precision is determined, it is not possible to change the quantization precision during a runtime.

Required optimal precision may vary depending on input data. However, according to the above conventional quantization method, it is not possible to change precision during inference, and power consumption efficiency of a neural network accelerator is accordingly low.

DISCLOSURE

Technical Problem

An object of the present invention is to provide an algorithm for dynamically changing quantization precision for a deep learning network which overcomes the limitations of the above conventional quantization method and is implemented with low power.

An object of the present invention is to provide a deep learning network capable of dynamically changing the quantization precision according to input data, and a quantization precision variable algorithm thereof.

An objection of the present invention is to provide a deep learning network capable of inferencing by applying quantization precision optimized to input data in order to improve power consumption efficiency of a neural network accelerator, and a quantization precision variable algorithm thereof.

Technical Solution

One aspect of the present invention includes generating a plurality of quantization models corresponding to a plurality of different bit numbers by performing quantization corresponding to the plurality of bit numbers on a deep learning network performing object recognition on any image, receiving image data as an input to the deep learning network, determining uncertainty of the received image data, selecting any one of the plurality of quantization models on the basis of the determined uncertainty, and performing object recognition on the image data through the selected quantization model and outputting a label corresponding to the image data as an object recognition result.

Advantageous Effects

According to the present invention, quantization precision for a deep learning network dynamically changes according to a feature of input data, and thus computation efficiency of the deep learning network is maximized.

DESCRIPTION OF DRAWINGS

FIG. 2 is a conceptual diagram illustrating components included in a control unit of an image recognition device according to an embodiment of the present invention.

BEST MODE OF THE INVENTION

Figure 1:
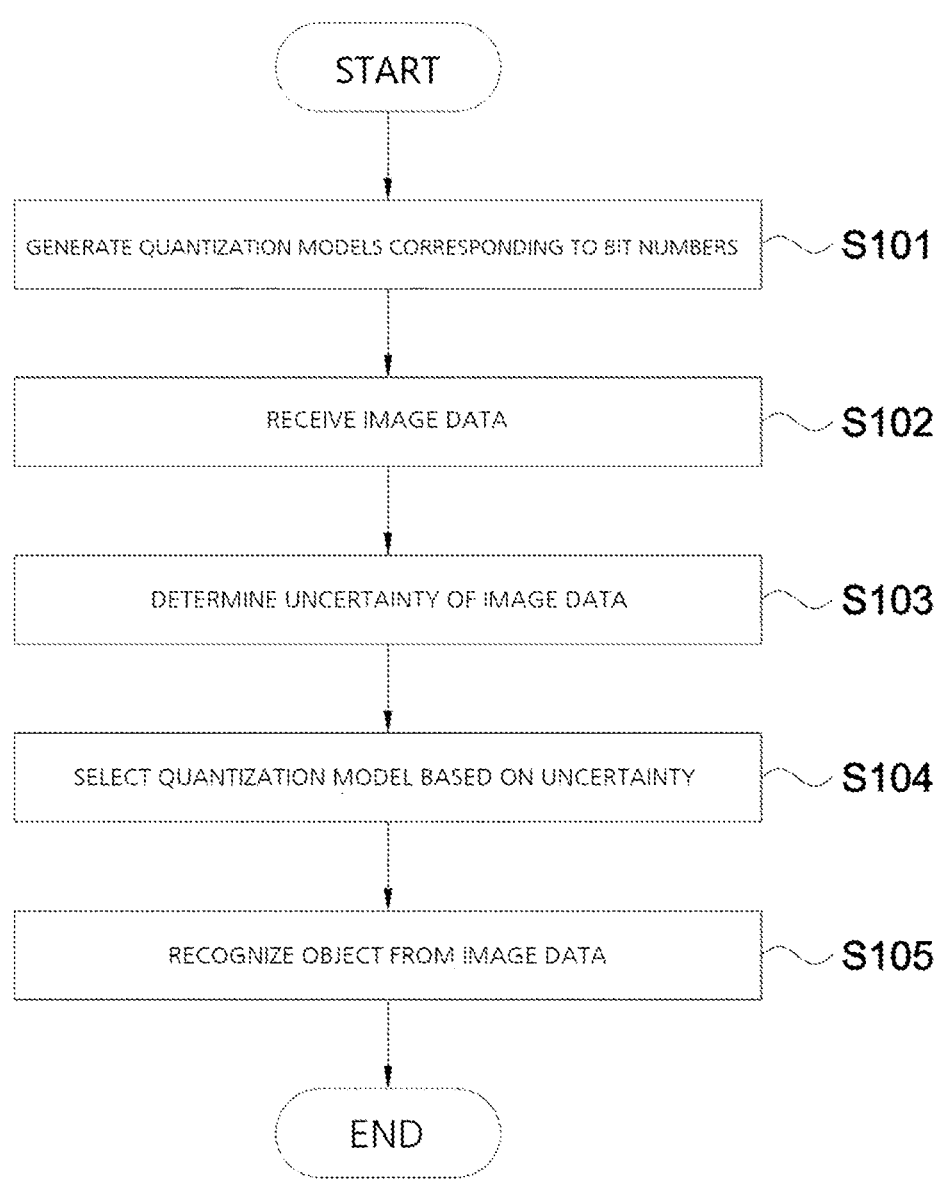
FIG. 1 is a flowchart illustrating a dynamic quantization method performed by an image recognition device according to the present invention.

An image recognition method includes an operation of generating a plurality of quantization models corresponding to a plurality of different bit numbers by performing quantization corresponding to the plurality of bit numbers on a deep learning network performing object recognition on any image, receiving image data as an input to the deep learning network, determining uncertainty of the received image data at preset intervals, selecting any one of the plurality of quantization models on the basis of the determined uncertainty, and performing object recognition on the image data through the selected quantization model and outputting a label corresponding to the image data as an object recognition result.

Modes of the Invention

Objects and effects of the present invention will become apparent through the following detailed description, but the objects and effects of the present invention are not limited thereto. In describing the present invention, when detailed description of well-known technology related to the present invention is determined to unnecessarily obscure the subject matter of the present invention, the detailed description will be omitted.

Hereinafter, embodiments of the present invention will be described in detail so that those skilled in the technical field to which the present invention pertains can easily implement the present invention with reference to the accompanying drawings. However, the present invention can be implemented in a variety of different forms and is not limited to the embodiments disclosed below. In the drawings, parts unrelated the present invention will be omitted to clearly disclose the present invention, and like reference numerals refer to like components.

FIG. 1 illustrates an image recognition method to which a dynamic quantization precision method performed by an algorithm for dynamically changing quantization precision for a deep learning network is applied according to the present invention.

As shown in FIG. 1, a control unit of an image recognition device according to the present invention may generate a plurality of quantization models corresponding to a plurality of different bit numbers by performing quantization corresponding to the plurality of bit numbers on a deep learning network which performs object recognition on an image (S101).

For example, 8-bit quantization may be performed on a main network to generate a first quantization model. Also, 4-bit quantization may be performed on the main network to generate a second quantization model, and 2-bit quantization may be performed on the main network to generate a third quantization model.

Meanwhile, the above examples are for convenience of description. The number of quantization models may be variably set, and various quantization distances may be applied.

Also, the number of quantization models may be variably adjusted according to the processor performance or memory performance of the image recognition device.

To increase power efficiency in a mobile environment or edge environment in which power consumption is more limited than in a server environment, a data quantization technology for replacing real number operations with integer operations is under development.

When small bit-width integer operations are used in neural network processing, power consumption per unit operation and data transmission power may be reduced, thus showing significant power consumption effects.

However, there is a problem of tradeoff that recognition accuracy is lowered as much as computation precision is lowered.

To solve this problem, the present invention proposes a variable quantization method in which performance degradation is minimized by generating a plurality of quantization models and selecting any one of the previously generated quantization models on the basis of uncertainty of input data.

After quantization modeling is completed, image data which is an object for object recognition is input (S102).

Also, the control unit of the image recognition device according to the present invention may determine uncertainty of the input image data (S103).

To variably apply any one of the plurality of quantization models as described above, the control unit of the image recognition device according to the present invention may determine uncertainty of the input image data.

Specifically, the control unit may determine the uncertainty of the image data on the basis of a class related to object recognition of the main network.

However, the amount of computation required for performing the uncertainty determination operation S103 is smaller than the amount of computation required for the deep learning network to perform object recognition.

In other words, as a separate network for performing the uncertainty determination operation S103, the control unit may include an uncertainty determination network in addition to the above-described main network.

Here, the uncertainty determination network may include a smaller number of layers than the main network (deep learning network).

Meanwhile, in another embodiment, when uncertainty is not determined from every frame of the image data but uncertainty from a previous frame extracted through the main network is used, the uncertainty determination network may not be used. The embodiment in which uncertainty is determined from frames at certain intervals will be described in further detail below with reference to FIG. 3.

The uncertainty determination operation S103 may also be performed by a model obtained by quantizing the uncertainty determination network on the basis of a certain number of bits.

According to an embodiment, the operation S103 of determining uncertainty may include a process of calculating probabilities that the input image data will correspond to a plurality of classes related to object recognition of the deep learning network and a process of calculating an uncertainty score on the basis of the probabilities calculated according to the plurality of classes.

According to an embodiment, uncertainty may be determined from every frame of the input image data.

Figure 3:
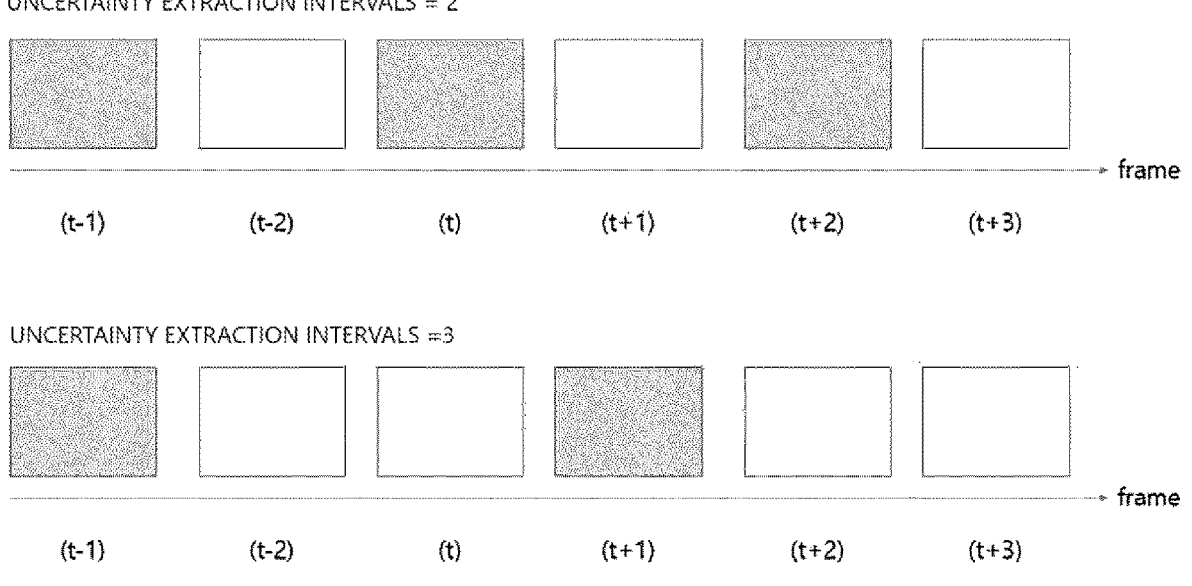
FIG. 3 is a conceptual diagram illustrating uncertainty determining interval.

According to another embodiment, referring to FIG. 3, uncertainty may be determined for the input image data at preset intervals.

In other words, the operation of determining uncertainty of the input image data at preset intervals may include a process of determining uncertainty from every certain number of frames.

In this way, when uncertainty is not determined from every frame but is determined at certain intervals, it is possible to reduce the amount of computation for determining uncertainty.

In the case of continuous image data, such as a video, there is almost no loss in accuracy even when uncertainty determined or calculated from a previous frame is used for a frame from which uncertainty has not been determined. Accordingly, efficient computation is possible by calculating uncertainty not from every frame but from every certain number of frames.

As an example, a default value of the intervals for determining uncertainty may be two frames or three frames. Also, the intervals for determining uncertainty may change according to a certain condition.

For example, the intervals for determining uncertainty may change on the basis of an uncertainty value determined from one frame. Here, the one frame may be a frame from which the last uncertainty has been determined.

When uncertainty is determined as described above, the control unit may select any one of the plurality of quantization models (S104). The control unit may perform object recognition on the input image data using the selected quantization model and output a label corresponding to the image data as an object recognition result (S105).

Specifically, in the case of performing the operation S104 of selecting any one of the plurality of quantization models, the control unit may select the first quantization model when the determined uncertainty is a preset first reference value or more.

Also, the control unit may select the third quantization model when the determined uncertainty is a preset second reference value or less.

In other words, when the determined uncertainty of the input image data is greater than or equal to the preset first reference value which is an upper limit reference value, the control unit may select the first quantization model having relatively high performance to perform object recognition. On the other hand, when the determined uncertainty is less than or equal to the preset second reference value which is a lower limit reference value, the control unit may select the third quantization model having relatively low performance to perform object recognition.

According to an embodiment, the operation of determining any one of the plurality of quantization models on the basis of the determined uncertainty may include a process of selecting any one of the plurality of quantization models for a frame from which uncertainty has been determined using the determined uncertainty, and a process of selecting any one of the plurality of quantization models for a frame from which uncertainty has not been determined using uncertainty determined from a previous frame.

In this way, according to the present invention, the aims of power consumption and performance retention can be achieved simultaneously by variably selecting a quantization model for performing object recognition.

FIG. 2 is a conceptual diagram illustrating components of an image recognition device for performing object recognition to which the above-described quantization method is applied.

Referring to FIG. 2, as components of a control unit 200 of the image recognition device, an uncertainty determination unit 202 for performing a precision determination technology, a neural network accelerator 204 for making a dynamic change to any one of a plurality of quantization models, and a postprocessing unit 205 for performing object recognition postprocessing on the basis of a result output from the neural network accelerator 204 are illustrated.

The components of the control unit 200 may be physically implemented in the same computing device or implemented in different computing devices as necessary.

The above-described exemplary embodiments of the present invention have been disclosed for illustration. Various modifications, alterations, and additions can be made by those of ordinary skill in the art within the spirit and scope of the present invention, and the modifications, alterations, and additions should be construed as falling in the scope of the following claims. Since those skilled in the technical field to which the present invention pertains can make various substitutions, modifications, and alterations within the technical scope of the present invention, the present invention is not limited to the above-described embodiments and the accompanying drawings.

In the above-described exemplary system, methods are described as a series of steps or blocks on the basis of a flowchart. However, the present invention is not limited to the order of steps, and some steps may be performed in a different order from that described above or concurrently. In addition, those of ordinary skill in the art should appreciate that steps shown in the flowchart are not exclusive and other steps may be included or one or more steps in the flowchart may be deleted without affecting the scope of the present invention.

INDUSTRIAL APPLICABILITY

According to the present invention, quantization precision for a deep learning network dynamically changes according to a feature of input data, and thus computation efficiency of the deep learning network is maximized.

The invention claimed is:
1. An image recognition method comprising:
generating a plurality of quantization models corresponding to a plurality of different bit numbers by performing quantization corresponding to the plurality of bit numbers on a deep learning network which performs object recognition on any image;

receiving image data as an input to the deep learning network;

determining uncertainty of the received image data at preset intervals;

selecting any one of the plurality of quantization models on the basis of the determined uncertainty; and performing object recognition on the image data through the selected quantization model and outputting a label corresponding to the image data as an object recognition result, wherein the determining of the uncertainty of the received image data at the preset intervals comprises determining uncertainty from every certain number of frames, wherein the selecting of any one of the plurality of quantization models on the basis of the determined uncertainty comprises:

for a frame from which uncertainty has been determined, selecting any one of the plurality of quantization models using the determined uncertainty; and for a frame from which uncertainty has not been determined, selecting any one of the plurality of quantization models using uncertainty determined from a previous frame.

2. The image recognition method of claim 1, further comprising changing the intervals for determining uncertainty on the basis of the determined uncertainty.

3. The image recognition method of claim 1, wherein the generating of the plurality of quantization models comprises:

generating a first quantization model corresponding to 8 bits;

generating a second quantization model corresponding to 4 bits; and generating a third quantization model corresponding to 2 bits.

4. The image recognition method of claim 3, wherein the selecting any one of the plurality of quantization models comprises, when the determined uncertainty is a preset first reference value or more, selecting the first quantization model.

5. The image recognition method of claim 4, wherein the selecting of any one of the plurality of quantization models comprises, when the determined uncertainty is a preset second reference value or less, selecting the third quantization model.

6. The image recognition method of claim 1, wherein the determining of the uncertainty comprises:

calculating probabilities that the input image data will correspond to a plurality of classes related to object recognition of the deep learning network; and calculating an uncertainty score on the basis of the probabilities calculated according to the plurality of classes.

7. The image recognition method of claim 1, wherein the determining of the uncertainty is performed by an uncertainty determination network which is separate from the deep learning network, and the uncertainty determination network includes a smaller number of layers than the deep learning network.

8. An image recognition method comprising:
generating a plurality of quantization models corresponding to a plurality of different bit numbers by performing quantization corresponding to the plurality of bit numbers on a deep learning network which performs object recognition on any image;

receiving image data as an input to the deep learning network;

determining uncertainty of the received image data at preset intervals;

selecting any one of the plurality of quantization models on the basis of the determined uncertainty; and performing object recognition on the image data through the selected quantization model and outputting a label corresponding to the image data as an object recognition result, wherein the determining of the uncertainty is performed by an uncertainty determination network which is separate from the deep learning network, and the uncertainty determination network includes a smaller number of layers than the deep learning network.

9. The image recognition method of claim 8, wherein the determining of the uncertainty of the received image data at the preset intervals comprises determining uncertainty from every certain number of frames.

10. The image recognition method of claim 8, further comprising changing the intervals for determining uncertainty on the basis of the determined uncertainty.

11. The image recognition method of claim 8, wherein the generating of the plurality of quantization models comprises:

generating a first quantization model corresponding to 8 bits;

generating a second quantization model corresponding to 4 bits; and generating a third quantization model corresponding to 2 bits.

12. The image recognition method of claim 11, wherein the selecting any one of the plurality of quantization models comprises, when the determined uncertainty is a preset first reference value or more, selecting the first quantization model.

13. The image recognition method of claim 12, wherein the selecting of any one of the plurality of quantization models comprises, when the determined uncertainty is a preset second reference value or less, selecting the third quantization model.

14. The image recognition method of claim 8, wherein the determining of the uncertainty comprises:

calculating probabilities that the input image data will correspond to a plurality of classes related to object recognition of the deep learning network; and calculating an uncertainty score on the basis of the probabilities calculated according to the plurality of classes.

\* \* \* \* \*